March 11, 1941.  R. J. RODRICK  2,234,709

WINDSHIELD WIPER

Filed April 12, 1939

*Inventor:*
RAYMOND J. RODRICK
By Donald W. Farrington ATTORNEY.

Patented Mar. 11, 1941

2,234,709

UNITED STATES PATENT OFFICE 2,234,709

WINDSHIELD WIPER

Raymond J. Rodrick, Akron, Ohio

Application April 12, 1939, Serial No. 267,412

5 Claims. (Cl. 15—250)

This invention relates to windshield wipers and more particularly to a clip adapted to secure a windshield wiper blade to a wiper arm.

It is among the objects of my invention to provide a windshield wiper clip which is adapted to receive a windshield wiper arm having a substantially flat surface at that end of the arm secured to the clip.

It is a further object of my invention to provide a clip constructed in accordance with the preceding object in which the clip is pivotally secured to the wiper blade on an axis transverse to the longitudinal axis of the wiper blade so that the asssembly comprising the blade, clip and arm will be self-adjusting with respect to the windshield to be wiped.

It is a further object of my invention to provide a clip constructed according to the preceding objects in which the clip is securely fixed to a wiper arm of the character described and constitutes in effect an extension of such arm so as to present a pair of depending ears which will embrace an attaching portion carried by the windshield wiper blade.

Further objects and advantages relating to simplicity in construction and economies in manufacture will appear from the following description and the appended drawing, wherein Figure 1 is a perspective view of a wiper blade and arm assembly constructed according to my invention;

It is understood by those familiar with this art that windshield wiper constructions vary from year to year and vary in the type of arm provided in the windshield wiper assembly.

It is also well understood that of the windshield wiper assembly, the part which requires frequent replacement is the blade or wiping element. Since there are a number of different wiper arms, enjoying wide current use, the manufacturer of replacement wiper blades is confronted with a serious problem in furnishing a wiper blade having a clip or means of attachment thereon, which is adapted to receive any one of the various wiper arms.

I have illustrated my invention as being applied to a tubular type of windshield wiper blade, and I have included in my invention a part of the saddle or clip construction which is ordinarily furnished with the tubular type of blade and which is in general use.

Figure 1:
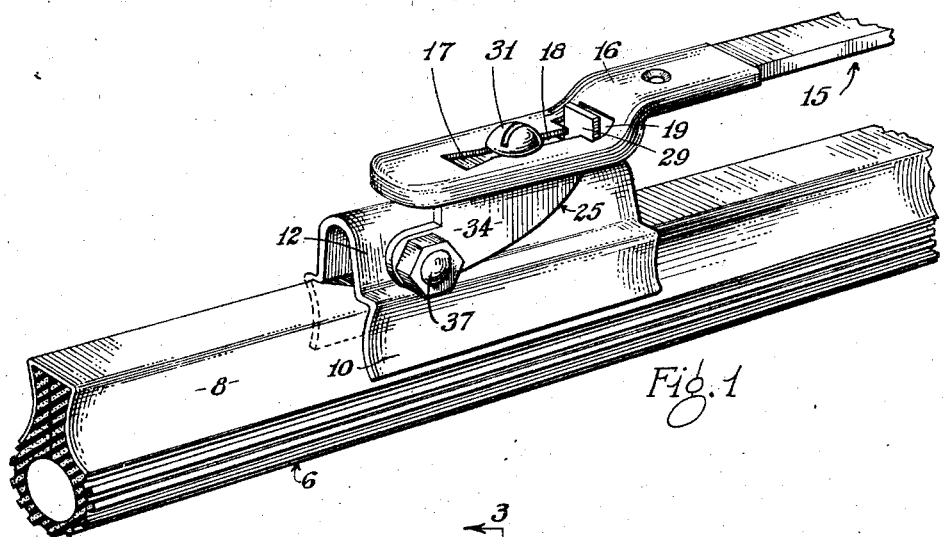
Figure 2:
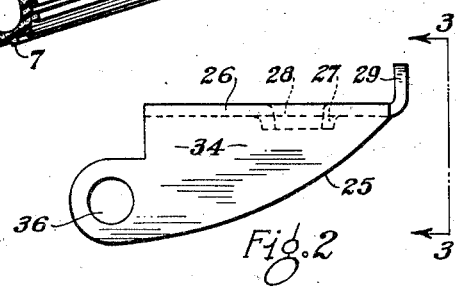
Figure 2 is an elevation of a part of the wiper blade clip constructed according to my invention.
Figure 3:
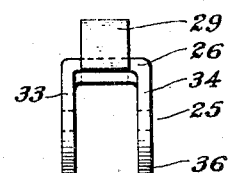
Figure 3 is a view taken in the direction indicated by arrows 3—3 of Figure 2.
Figure 6:
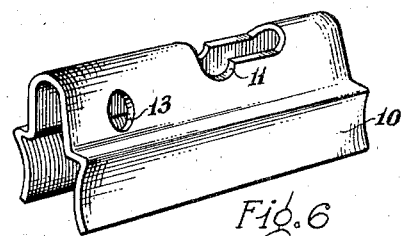
Figure 6 is an elevation of a saddle element forming a part of my invention.

The blade is indicated in its entirety as at 6 and comprises a tubular wiping portion 7 secured in the metal channel 8. A saddle 10 is positioned to embrace the back of the wiper blade as indicated in Figure 1. The saddle 10 is preferably constructed as shown in Figure 6 and is provided at its upper edge as at 11 with a notch or opening adapted to receive what is known in the art as a hook-type wiper arm. Reference is made to Patent No. 2,127,142, dated August 16, 1938 to Raymond A. Rodrick, for a more detailed description of the construction of the wiper blade and the functions of the saddle 10 ordinarily employed in conjunction therewith.

The wiper arm is indicated in its entirety as at 15 and includes a sheet metal tip 16 which is provided with a T-shaped slot as at 17, 18 and 19, and to secure this type of arm to the wiper blade 6, I prefer to employ a pivoted clip or connector indicated in its entirety as at 25. The connector 25 comprises a flat portion 26 adapted to lie beneath the flat portion of the tip 16 and is drawn or stamped out as at 27 to provide an aperture 28. Integrally formed with the flat section 26 is an upturned tongue 29 arranged to project upwardly through that portion of the slot indicated at 19. The upturned portion 29 is preferably proportioned so that when the arm is assembled with the connector as shown in Figure 1, the tongue 29 prevents longitudinal movement of the connector 25 with respect to the arm 15.

The arm is fixed to the connector 25 in the assembled position shown in Figure 1 by inserting a self-tapping screw 31 through the slot portion 18 and rotating the same so as to form threads in the drawn or extruded tubular section 27.

A pair of depending ears 33 and 34 are integrally formed with the section 26 and are adapted to embrace the back portion 12 of the saddle 10. The forward edges of the ears are extended and apertured as at 36 to receive a fastening element 37 extending transversely through apertures 13 in the walls of the back portion 12 of the saddle 10. The fastening element 37 is shown as being a conventional bolt and nut arrangement but it will be understood that this fastening device may be replaced by a cotter pin or the like.

When a blade equipped with a clip constructed according to my invention is assembled upon the vehicle, the forward wiping surface of the blade element 7 will be properly presented to the windshield glass and the blade will adjust itself to proper wiping relation regardless of the angle which the arm 15 makes with respect to the glass due to the pivoting action between the arm and the blade through the element 37.

Figure 4:
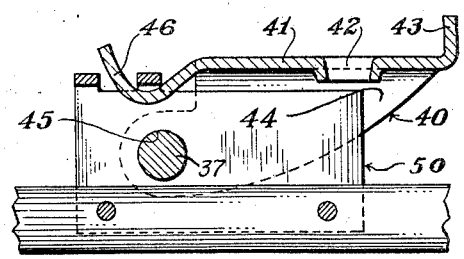
Figure 4 is an elevation with parts in section of a modified form of clip constructed according to my invention.

In Figure 4 I have shown a modified form of my connector element which is indicated in its entirety as at 40. This form of connector element comprises a flat section 41 having an aperture 42, and an upturned tongue 43 constructed and arranged substantially as shown in the preferred embodiment. The connector element 40 is also provided with depending ears such as at 44 which may be apertured as at 45 to receive the fastening element 37, substantially as heretofore described.

The forward end of the flat section 26 in this modification is provided with a bendable tongue 46 and when this form of my invention is assembled with a wiper arm as illustrated in Figure 1, the arm and clip may be applied to a wiper blade having an attaching portion constructed as shown at 50 in Figure 4. This type of attaching portion is designed to take a wiper arm having an upturned hook and the clip 40 according to my invention adapts a flat-ended arm such as 15 of Figure 1 to operate with a blade having an attaching portion such as 50. In the event the attaching portion 50 is not apertured transversely to take the fastener 37, the hook 46 in cooperation with the depending ears 44 secures the arm to the blade.

Figure 7:
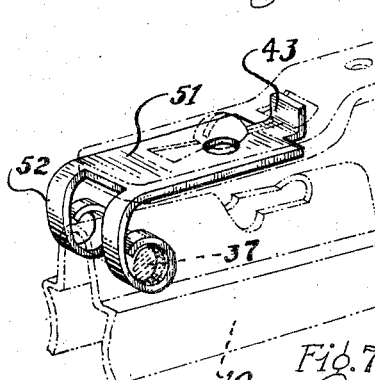
Figure 7 is a perspective view of the clip shown in Figure 5 with the wiper arm and wiper blade portion in dotted outline.
Figure 5:
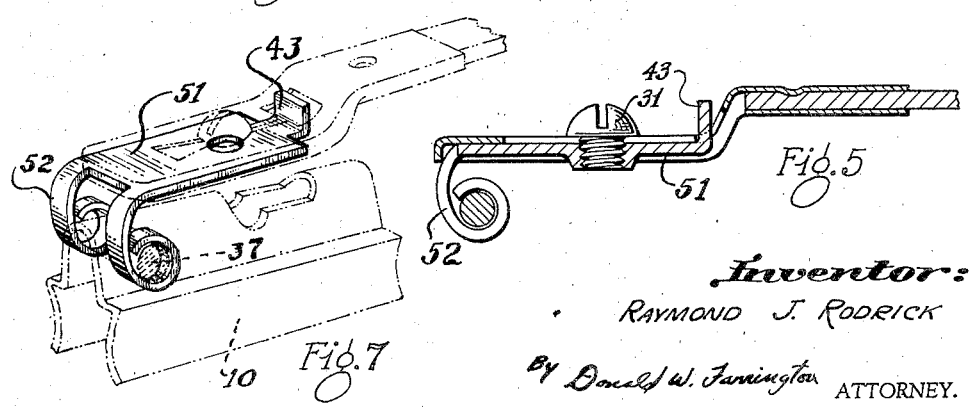
Figure 5 is an elevation with parts in section showing a further modification in its assembled position with the windshield wiper arm.

That form of my invention shown in Figures 5 and 7 is quite similar to that shown in Figure 1 in that it includes a flat portion such as 51, a drawn or extruded portion 52 to receive the screw 31 and an upturned tongue 43. The last-named parts function in the same manner as the corresponding parts in the preferred embodiment. The modification of Figures 5 and 7 is distinguished over the preferred form in the way in which it is secured to the blade. It will be noted by reference to Figures 5 and 7 that the depending ears have been dispensed with and that a pair of flat, depending, curled straps 52 are arranged to encircle the connecting pin 37. I have found that this form of my invention affords a strong resilient attachment between the arm and blade which is a distinct advantage with such wiper blades as are required to "flop" from side to side during their wiping action.

It will be understood particularly by a reference to the Rodrick patent above referred to that in the event the motor vehicle is provided with a hook type of wiper arm, or a wiper arm having depending ears, the connector elements such as 25 and 40 may be dispensed with and the arm connected to the saddle in the manner disclosed in said patent.

Although I have shown and described three forms of my invention in considerable detail, it will be appreciated by those skilled in the art that colorable variations or modifications may be made therein without departing from the scope of my invention as defined in the following claims:

I claim:

1. A windshield wiper arm and blade assembly comprising, a wiper arm having a flat portion at the end thereof, a slot extending longitudinally of the arm in said flat portion, a second slot extending transversely with respect to said first-named slot, a connector element pivoted to the back of said blade, on an axis transverse to the longitudinal axis of the blade, said element having a flat portion arranged beneath said first-named slot and having an upturned tongue projecting upwardly through said second-named slot, and a fastening device extending through the first-named slot into said flat portion of the connector element.

2. A wiper arm and blade assembly comprising, a wiper arm having a flat sheet metal end portion joined to the arm by an integral section extending at an angle with respect to said flat portion, said flat portion having a slot extending longitudinally of the arm and said section having a slot extending transversely of the arm, a wiper blade provided with a connector element pivotally joined thereto on an axis transverse to the longitudinal axis of the blade, said element provided with a flat section to bear against the underside of the flat portion of said arm and proportioned to cover said longitudinal slot, an upturned tongue carried by said element arranged to project through said transverse slot and a fastening element extending through said longitudinal slot into the flat section of the connector to hold the connector and arm in assembled relation.

3. A wiper blade and arm assembly including a wiper arm having a flat end portion adapted to be secured to the wiper blade, said wiper blade provided with a connector element having a flat section arranged to bear against the underside of the end of said arm and a pair of depending ears provided with aligned apertures, a fastening device extending transversely of the wiper blade and through said apertured ears to pivotally mount said element on the blade, the flat portion of said element being provided with an upturned hook at its forward end and an upwardly extending tongue at its rearward end, said wiper arm provided with a slot extending transversely of the arm, said slot proportioned to receive the tongue at the rearward end of said element, said wiper blade provided with an attaching portion proportioned to fit between said ears and having an opening adapted to receive said upturned hook.

4. A wiper arm and blade assembly comprising a wiper arm having a blade attaching portion at the end thereof including a flat sheet metal section provided with a T-shaped slot, a connector element pivotally secured to the back of the wiper blade, said element comprising a flat portion adapted to be arranged beneath said slot and an upwardly extending tongue portion adapted to project through said slot, said element provided with a pair of spaced, downwardly-curled straps at its forward end proportioned to embrace the back of a wiper blade portion and a fastening device extending through said wiper blade portion and through both of said straps.

5. A wiper arm and blade assembly comprising, a wiper arm having a flat attaching portion at the end thereof, said flat portion provided with intersecting slots normal to each other, a connector element having an integral portion extending through one of said slots and a removable fastener extending through the other slot, said connector element provided with an upturned hook at its forward end, a wiper blade provided with an attaching part adapted to bear against the under side of said connector element, said part having an aperture arranged to receive said upturned hook and secure the clip and arm to the blade.

RAYMOND J. RODRICK.